United States Patent
Goodman

(10) Patent No.: US 7,933,166 B2
(45) Date of Patent: Apr. 26, 2011

(54) AUTONOMOUS DEPTH CONTROL FOR WELLBORE EQUIPMENT

(75) Inventor: Kenneth Goodman, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 608 days.

(21) Appl. No.: 11/697,868

(22) Filed: Apr. 9, 2007

(65) Prior Publication Data
US 2008/0247268 A1  Oct. 9, 2008

(51) Int. Cl.
*G01V 1/00* (2006.01)
*G01V 1/40* (2006.01)

(52) U.S. Cl. .............................. 367/25; 702/6

(58) Field of Classification Search .............. 367/25, 367/33, 69; 702/6; 33/719; 340/853.3, 853.6, 340/854.1, 854.2
See application file for complete search history.

(56) References Cited

U.S. PATENT DOCUMENTS

| | | |
|---|---|---|
| 4,030,064 A | 6/1977 | Elliott |
| 4,864,629 A | 9/1989 | Deering |
| 5,107,705 A | 4/1992 | Wraight |
| 5,578,813 A | 11/1996 | Allen |
| 5,644,139 A * | 7/1997 | Allen et al. .................. 250/557 |
| 5,786,804 A | 7/1998 | Gordon |
| 5,899,958 A | 5/1999 | Dowell |
| 6,281,882 B1 | 8/2001 | Gordon |
| 6,433,780 B1 | 8/2002 | Gordon |
| 6,442,725 B1 | 8/2002 | Schipke |
| 6,725,924 B2 | 4/2004 | Davidson |
| 7,346,454 B2 * | 3/2008 | Mathieu et al. ................ 702/6 |
| 2005/0149265 A1 | 7/2005 | Reniska |
| 2006/0285436 A1 * | 12/2006 | Mayorga Lopez et al. ..... 367/27 |
| 2007/0014435 A1 | 1/2007 | Mirowski |
| 2009/0012710 A1 * | 1/2009 | Van Os et al. .................. 702/6 |

FOREIGN PATENT DOCUMENTS

| | | |
|---|---|---|
| EP | 0449710 A2 | 10/1991 |
| EP | 11806473 A1 | 7/2007 |
| SU | 1518497 A1 | 10/1989 |
| WO | 2006006417 A1 | 8/2006 |
| WO | 2007020492 | 2/2007 |

* cited by examiner

*Primary Examiner* — Jack Keith
*Assistant Examiner* — Krystine Breier
(74) *Attorney, Agent, or Firm* — Osha Liang LLP; Kevin B. McGoff; Rodney V. Warfford

(57) ABSTRACT

A method for tracking a wellbore tool includes: obtaining a first image of the wellbore using an imager associated with the tool; obtaining a second image of the wellbore using the imager after a selected time period; matching the first image with the second image by shifting one of the first and second images; determining an amount of the shifting; and comparing the amount of the shifting with a reference distance to determine a distance of tool movement. A method for tracking a wellbore tool includes: obtaining an image of a wellbore feature using a first imager associated with the tool; moving the tool in the wellbore; and registering a distance of tool movement when the image of the wellbore feature is detected by a second imager spaced apart from the first imager, wherein the distance of tool movement equals a spacing between the first and second imagers.

17 Claims, 6 Drawing Sheets

AUTONOMOUS DEPTH CONTROL FOR WELLBORE EQUIPMENT

FIELD OF THE INVENTION

The present invention relates to methods and apparatuses for control of downhole tools. Particularly, the present invention relates to methods and apparatus for controlling downhole tools with respect to depth in a wellbore.

BACKGROUND OF THE INVENTION

Collection of accurate geophysical property data is a key to successful exploration and production of petroleum resources. Based on data collected in a wellbore (such as electrical and nuclear properties), as well as the propagation of sound through a formation, geophysicists make many important operational decisions. For example, geophysicists may use wellbore data to select where to set casing in a well and how to perforate a well to stimulate hydrocarbon flow.

One method of collecting wellbore geophysical properties is by way of wireline well-logging. In wireline well-logging, a well-logging tool (also often referred to as a sonde) is lowered into a wellbore on an electrical cable, the wireline. The well-logging tool is an electrically powered measurement device that may, for example, collect electrical data, sonic waveforms that have propagated through the surrounding formation, or radioactivity counts. These measurements are usually converted to a digital form and transmitted on the wireline. Other methods of well-logging are known as logging while drilling (LWD) and measuring while drilling (MWD). In these types of well-logging, data are collected during the drilling operation.

Well-logging data are normally indexed by the depth at which the measurements were made. With modern equipment, the logging measurements may also be made based on a time interval rather than on a depth interval. Such time domain logs are ultimately converted into depth indexed data.

The accuracy of the data is a crucial element in the value of the well-log data. Data accuracy depends on both the accuracy of the measurements and the accuracy of the depth index.

In wireline logging the depth index is usually determined by measuring how much cable has been lowered into the borehole and measuring how much cable has been reeled back in. These measurements are done at the surface as the cable passes through an Integrated Depth Wheel (IDW). However, IDW measurements are prone to inaccuracies with respect to the actual depth of the measurement tools. For example, if the tools become stuck in the borehole (due to various borehole conditions) while the well is being logged in an uphole direction, the cable may stretch as the winch continues to reel in the cable. Similar problems also occur in LWD and MWD logging because, for example, coil tubing and drill pipe may become bent.

Several different approaches have been suggested for adjusting the recorded depth index. One approach described in U.S. Pat. No. 5,019,978, issued to Howard, Jr. et al., uses accelerometers to determine the location of the measurement tools. The accelerometer data are applied in an algorithm to correct the depth index. Another approach described in U.S. Pat. No. 6,704,655, issued to Kelly, uses tension meter data in combination with the accelerometer data in a proportional-integral-derivative control loop algorithm to correct the depth index. U.S. Pat. No. 7,020,557 issued to Reniska discloses a wireline well-logging data acquisition system and methods for establishing corrected depth based on pressure readings from two pressure sensors separated by a known distance.

Accordingly, there is still a need for better and improved methods for obtaining correct depth measurements and for controlling downhole equipment at accurate depth during downhole operations.

SUMMARY OF INVENTION

In one aspect, some embodiments of the invention relate to methods for tracking a tool in a wellbore. A method in accordance with one embodiment of the invention includes: obtaining a first image of the wellbore using an imager associated with the tool; obtaining a second image of the wellbore using the imager after a selected time period; matching the first image with the second image by shifting one of the first and second images; determining an amount of the shifting; and comparing the amount of the shifting with a reference distance to determine a distance of tool movement.

Another method in accordance with one embodiment of the invention includes: obtaining an image of a wellbore feature using a first imager associated with the tool; moving the tool in the wellbore; and registering a distance of tool movement when the image of the wellbore feature is detected by a second imager spaced apart from the first imager, wherein the distance of tool movement equals a spacing between the first and second imagers.

In another aspect, some embodiments of the invention relate to systems for tracking a tool moving in a wellbore. A system in accordance with one embodiment of the invention includes: a processor and a memory, wherein the memory stores a program having instructions for: obtaining a first image of the wellbore using an imager associated with the tool; obtaining a second image of the wellbore using the imager after a selected time period; matching the first image with the second image by shifting one of the first image and the second image; determining an amount of the shifting; and comparing the amount of the shifting with a reference distance to determine a distance of tool movement.

Another system in accordance with one embodiment of the invention includes a processor and a memory, wherein the memory stores a program having instructions for: obtaining an image of a wellbore feature using a first imager associated with the tool; moving the toot in the wellbore; and registering a distance of tool movement when the image of the wellbore feature is detected by a second imager spaced apart from the first imager, wherein the distance of tool movement equals a spacing between the first imager and the second imager.

Other aspects and advantages of the invention will be apparent from the following description and the appended claims.

DETAILED DESCRIPTION

Embodiments of the invention relate to methods and apparatus for depth measurement and depth control of equipment in a wellbore. Methods of the invention use sensors or imagers for tracking the movement of a tool in a wellbore. Therefore, methods of the invention are particularly useful in tracking a tool in a wellbore with respect to the axial depth, which is the distance from the surface (well opening) running along the axis of the well to the tool location. In contrast, the methods noted above are more suitable for determining vertical depth, which is the vertical distance from the earth surface, regardless of the wellbore path.

In accordance with embodiments of the invention, one or more imagers (sensors) may be used to track or match the images of the wellbore. The imagers or sensors may be any type known in the art for wellbore imaging, including optical imagers, sonic imagers, and resistivity imagers. The image tracking coupled with a reference distance, which may be internal or external to the imagers, allows one to keep track of the tool movement in the wellbore.

Being able to track the tool movement in a wellbore allows a user to perform downhole operations more accurately with respect to well depth. In accordance with some embodiments of the invention, the ability to accurately track a tool with respect to well depth makes it possible to have a tool perform operations automatically when it reaches a predetermined depth. That is, embodiments of the invention make it possible to have autonomous depth control of a tool in a wellbore.

Embodiments of the invention may be used in various downhole operations, such as in drilling, logging, stimulation, and production operations. A device of the invention having the ability to track borehole image for depth control may be included in any tool used in a wellbore. For clarity of illustration, the following description will use a downhole tool system typically used in well logging to illustrate embodiments of the invention. However, one of ordinary skill in the art would appreciate that embodiments of the invention are not limited to the specific examples described below.

Figure 1:
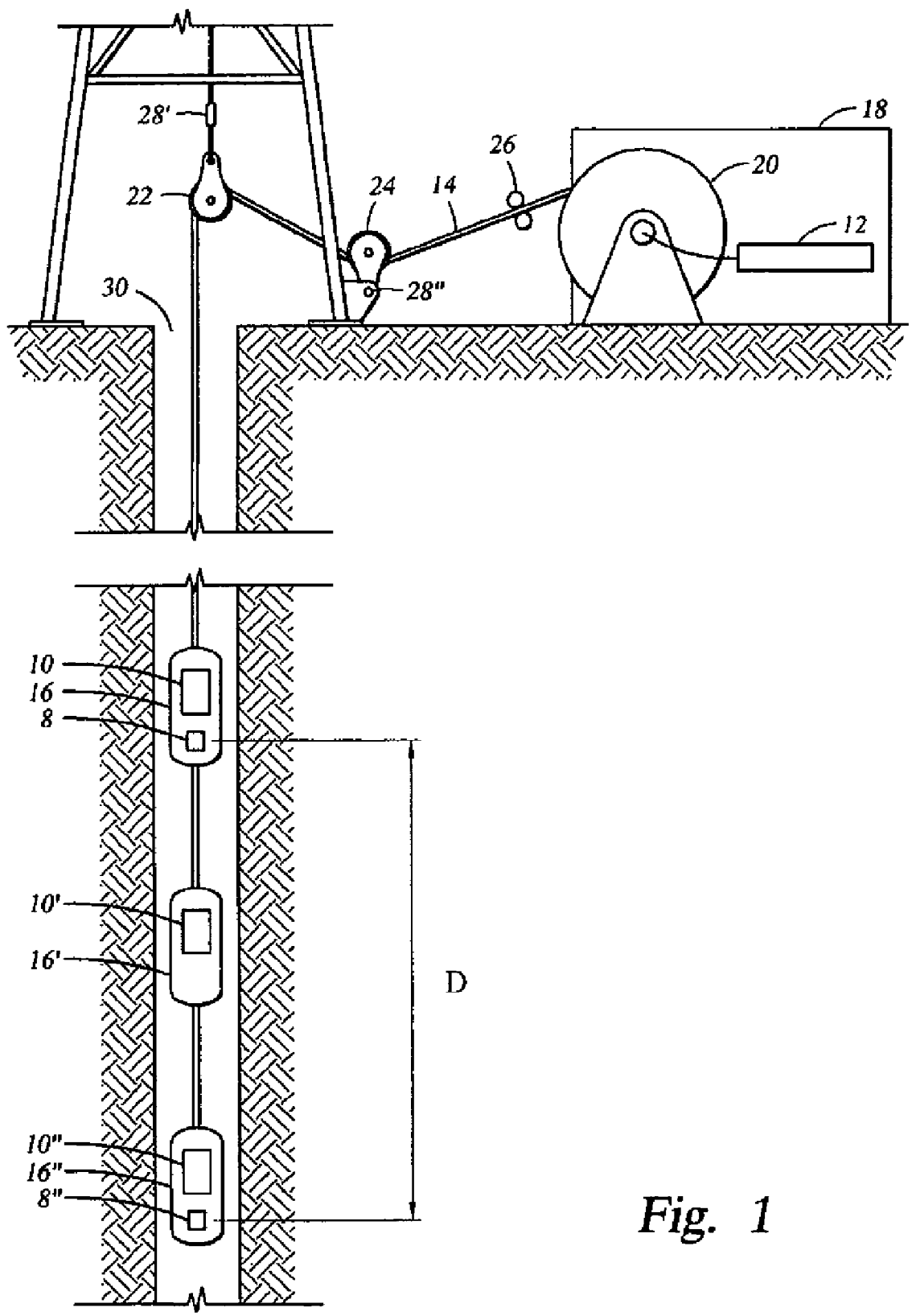
FIG. 1 is a schematic diagram illustrating a well-logging operation in accordance with one embodiment of the invention.

FIG. 1 illustrates a wireline logging system disposed in a wellbore 30. As shown, a plurality of well logging tools 16 (e.g., 16' and 16") may be connected to form a tool string. The well logging tools 16 are connected to a wireline cable 14, which can also transmit data uphole. In LWD applications, the collected data may be stored in the tool or transmitted to the surface using mud pulses. Each well logging tool 16 may include one or more downhole electronic instruments 10. The well logging tool 16 may also contain one or more sensors (or imager) 8. The imager/sensor 8 may be used to control the depth of the tool in the wellbore in accordance with embodiments of the invention. It is preferable to connect the logging tools 16-16" to one another rigidly in the axial direction, as such is related to the accuracy of measurements that is achievable. For example, one could replace/modify the wireline shown in FIG. 1 connecting the logging tools 16-16" with a more axially rigid member or device.

The wireline cable 14 is connected at the surface to a winch at a logging unit 18, which may be a well logging truck or an offshore logging unit. The wireline cable 14 passes through sheave wheels 22 and 24. The wireline cable 14 further may pass through a depth-measuring device 26, which is known as Integrated Depth Wheels (IDW) and provides the depth index in the conventional approach. In accordance with embodiments of the invention, the depth-measuring device 26 may be omitted or may be used to provide auxiliary depth reading.

The wireline cable 14 is further connected to a data acquisition computer 12. The data acquisition computer 12 may be a digital computer having components such as a memory, a central processing unit, one or more secondary storage devices, e.g., a disk drive and a monitor. The data acquisition computer 12 may contain a modem or other communication device for receiving and transmitting data from and onto the wireline cable 14. In accordance with some embodiments of the invention, the data acquisition computer 12 may be onboard the downhole tool 16. In this case, the onboard data acquisition computer 12 may only include a processor and a memory with a program to perform the image tracking; it may not include some of the components described below.

In accordance with some embodiments of the invention, additional tools 16' and 16" may be included in a tool string. If one of those tools also has an imager/sensor 8" (in addition to the imager 8 in tool 16), it becomes possible to track the images using an external (to the imager) distance reference (such as the spacing D between the two imagers) for image tracking. Note that embodiments of the invention may also use more than two imagers. In the particular embodiment shown, the two sensors 8 and 8" are located in different downhole tools 16 and 16" as shown. In accordance with some embodiments of the invention, the two or more imagers may be located in the same tool.

Figure 2:
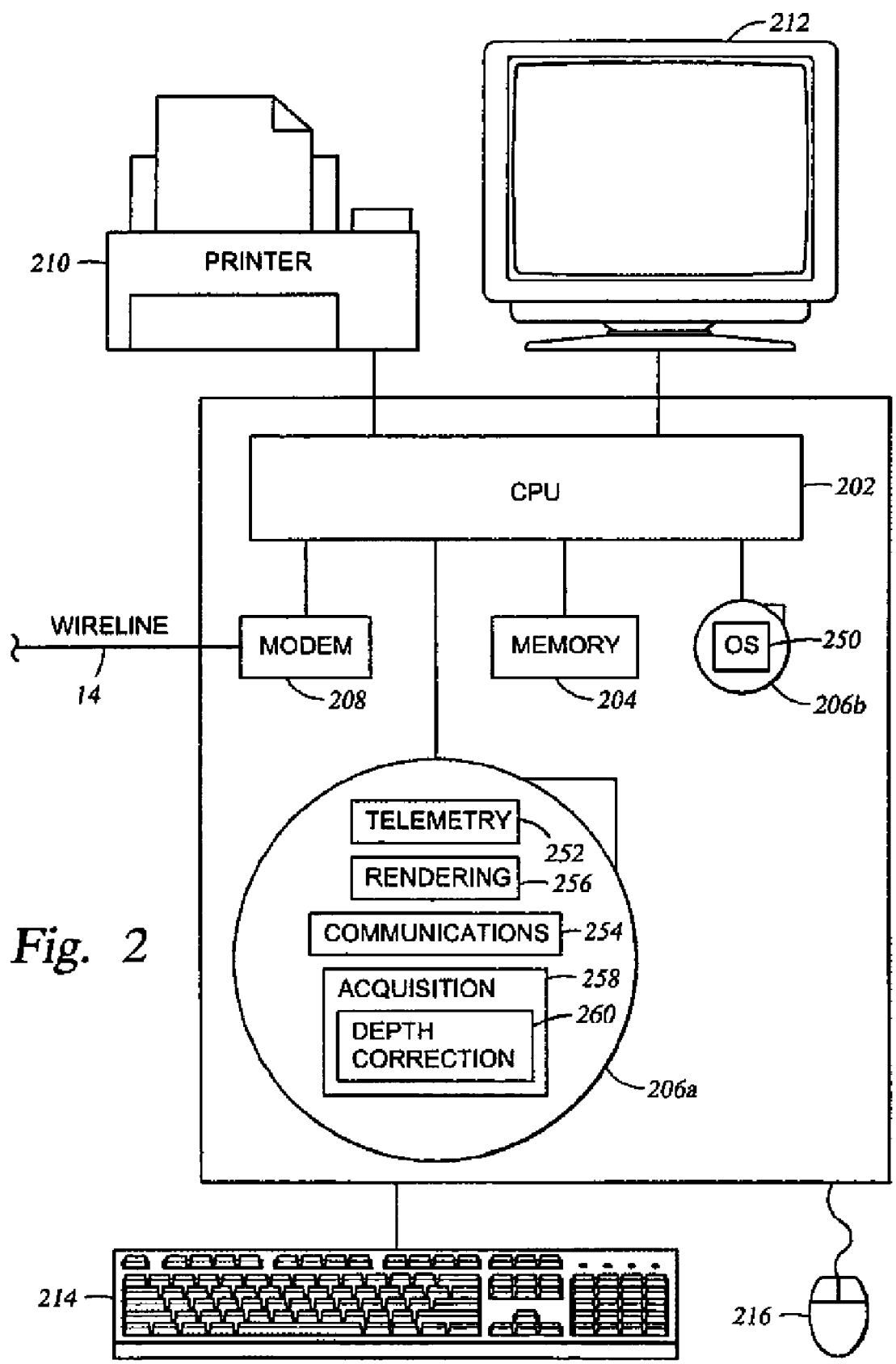
FIG. 2 is a schematic diagram of a wireline well-logging data acquisition computer system that may be used with embodiments of the invention.

FIG. 2 is an exemplary illustration of a data acquisition computer 12. The surface acquisition computer 12 contains one or more central processing units (CPU) 202. In the illustration, only one CPU is shown. However, in some implementations, multiple CPUs may be used. The CPU 202 is connected to one or more memory modules 204 (one shown). The memory modules may include, for example, random access memory (RAM), read-only memory (ROM), and erasable-programmable read-only memory (EPROM). The CPU 202 is also connected to one or more secondary storage devices 206, e.g., 206a and 206b. The CPU 202 is further connected to a modem or communication device 208. The modem or communication device 208 is connected to the wireline cable 14 and is operable to transmit and receive data via the wireline cable 14.

The data acquisition computer 12 may also be connected to input/output devices such as a printer 210, a monitor 212, a keyboard 214, or a mouse 216. The secondary storage devices store various computer programs for controlling the acquisition of data via the wireline 14. These computer programs may include an operating system (OS) 250, telemetry software 252, communications software 254, data rendering and visualization software 256, and data acquisition software 258. An acquisition software system may also include depth index correction software 260.

Embodiments of the invention may use any imager/sensor known in the art for image tracking, including optical imager, sonic imager, infrared, microwave, and resistivity imager. Although embodiments of the invention may use various types of imagers, the following description will use an optical imager to illustrate embodiments of the invention. The use of optical imagers for tracking is well known in the art, such as an optical mouse for a computer input, as disclosed in U.S. Pat. No. 6,281,882 issued to Gordon et al.

Figure 3:
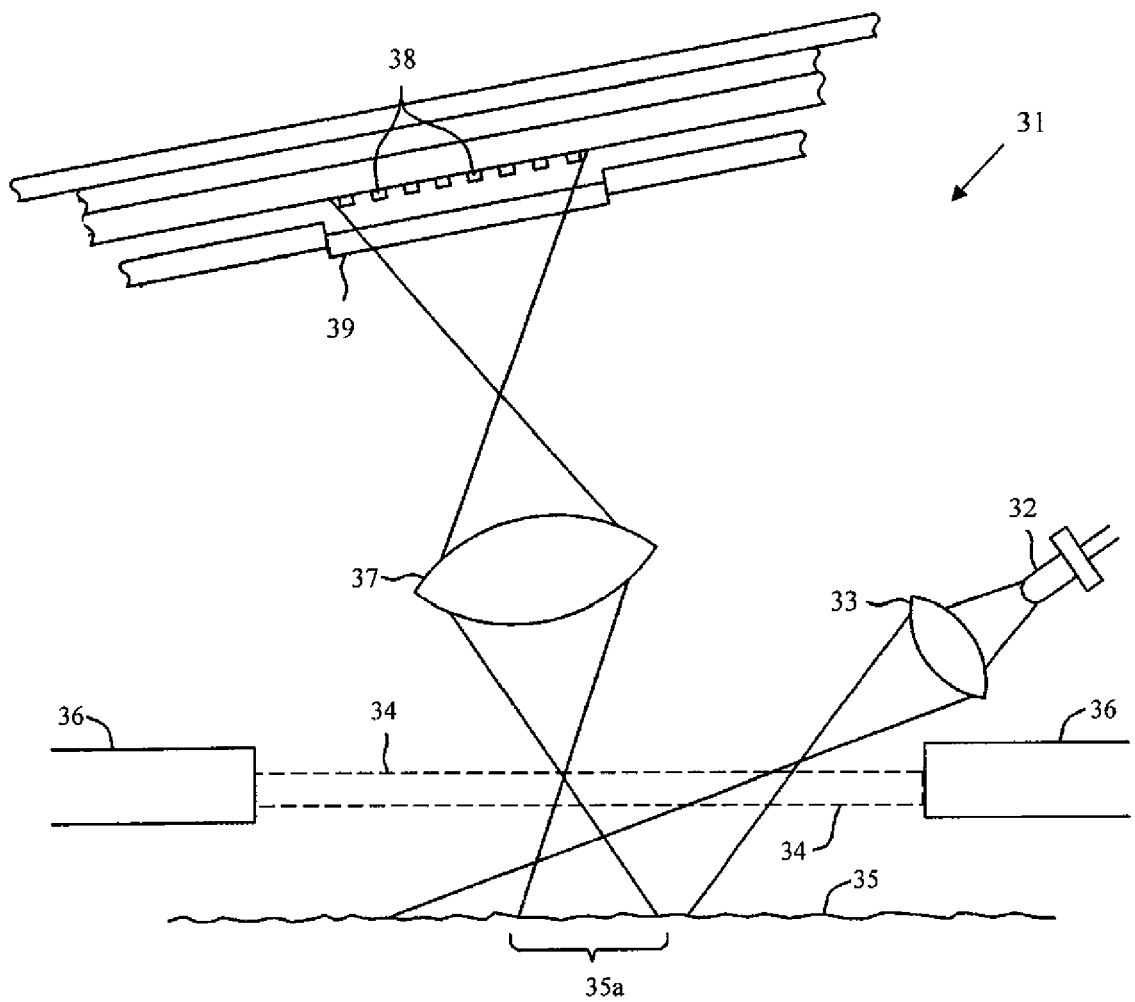
FIG. 3 is a diagram illustrating an optical imager that may be used with embodiments of the invention.

FIG. 3 illustrates a simplified representation of a cut-away side view of an imaging device (imager) 31 that may be used with embodiments of the invention. As shown in FIG. 3, a light source 32, which may be an IR LED or other suitable light source, emits light, which may be projected by lens 33 (which may be an integral part of the light source package), through window 34 in the housing 36 and onto a region 35a that is part of a wellbore wall 35. The illumination of wellbore wall surfaces may be performed with an incidence angle other than 90 degrees, as shown in FIG. 3. Illumination with an incidence angle less than 90 degrees may accentuate the pattern of highlights and shadows produced by surface height irregularities.

As shown in FIG. 3, an image of the illuminated region 35a is projected through an optical window 39 onto an array 38 of photo detectors. This may be done with the aid of lens 37. The window 39 and lens 37 may also be combined into one element. The photo detectors may comprise an array of detectors, each detector being a photo transistor. Examples of photo sensor arrays that may be used with embodiments of the invention may include CCD (charge coupled device) and CMOS (complementary metal oxide semiconductor) sensors.

Figure 4:
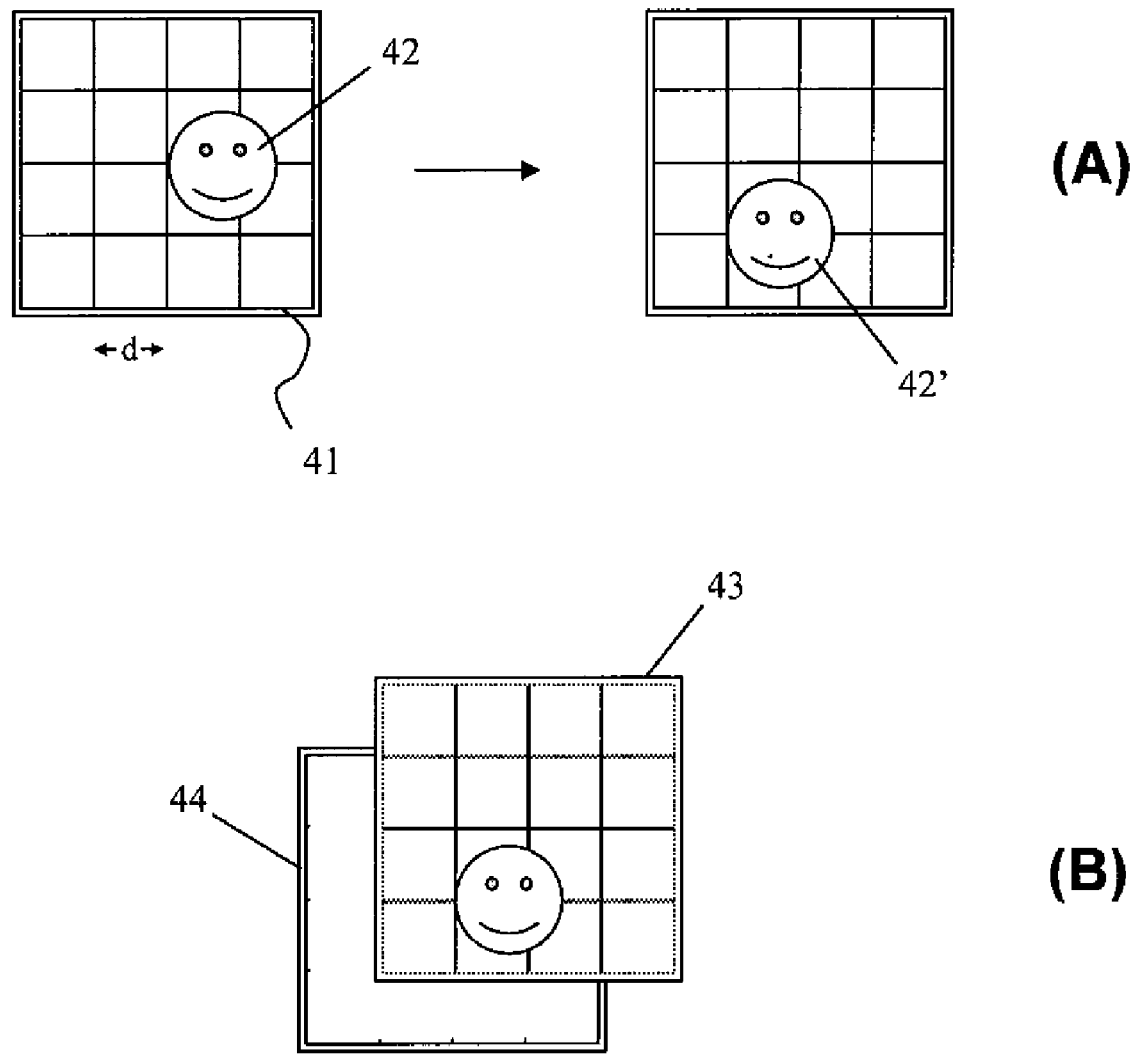
FIG. 4A and FIG. 4B shows diagrams illustrating image matching in accordance with one embodiment of the invention.

FIG. 4A illustrates how an image sensor, such as that shown in FIG. 3, may be used to track the depth of a tool in a wellbore. As shown in FIG. 4A, an imager 41 has a 4×4 sensor array, which has a resolution of "d," the distance between neighboring cells. Initially, the imager 41 detects an image 42 at a certain location within the array. The image 42 may be any notable feature within the image area (shown as 35a in FIG. 3). After the tool has moved a certain distance, the imager 41 now detects an image 42' that is located at a different location within the array. To determine how much the tool has moved, one can determine how much the image has shifted within the sensor array.

FIG. 4B shows that if one shifts the imager 43 to a new location indicated by imager 44, then the image 42' will appear at the same location within the sensor array as if the tool had not moved. In this particular example, the imager 43 is shifted by "d" distance down and by "d" distance to the left to get to the location of imager 44. Therefore, one can conclude that the image 42' has shifted from 42 (FIG. 4A) by "d" distance down and "d" distance to the left. Accordingly, the tool has moved by "d" distance up and "d" distance to the right in this particular example.

The example illustrated in FIGS. 4A and 4B uses an internal dimension in the sensor (i.e., the distance between the neighboring sensor cells, d) as a reference to track the depth or movement of a tool. One of ordinary skill in the art would appreciate that embodiments of the invention may also use external distance references to assess the depth or distance of travel of a tool in a wellbore. To use an external distance reference (i.e., the distance reference is not found within a single imager), one may use two or more imagers/sensors with a known spacing between the imagers/sensors.

Figure 5:
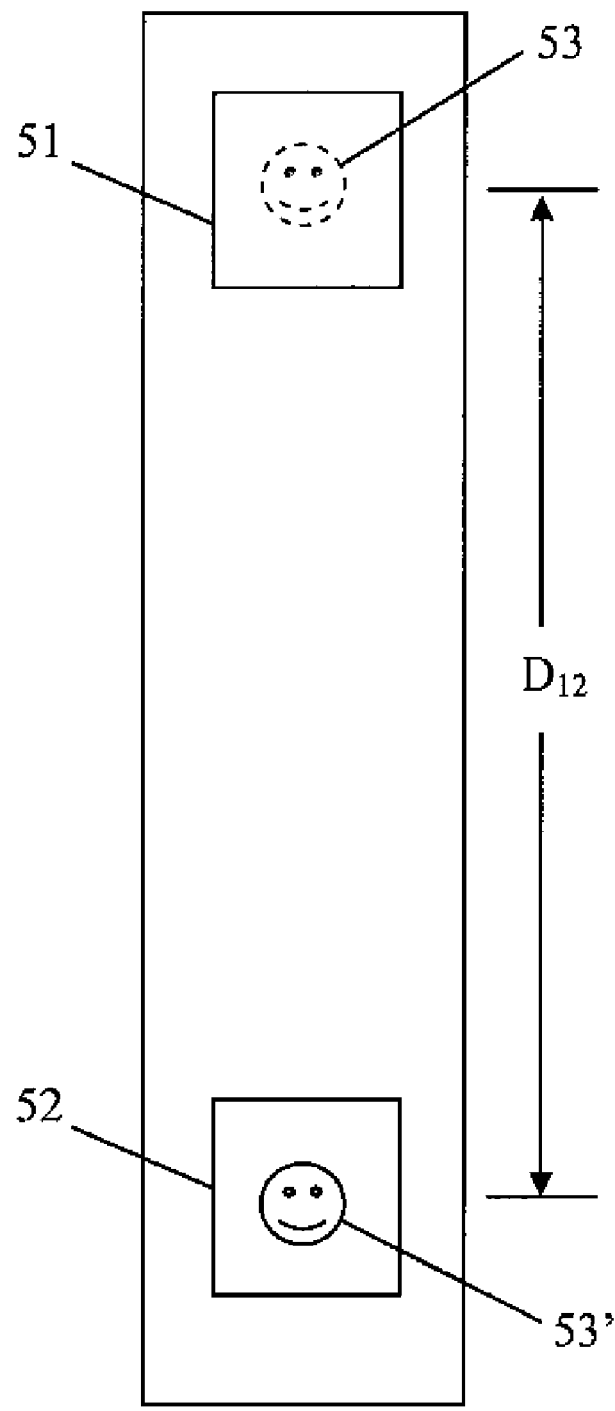
FIG. 5 shows a tool having two imagers in accordance with one embodiment of the invention.

FIG. 5 shows one example that uses two imagers 51 and 52, which are disposed on a downhole tool at a distance $D_{12}$ apart. The image 53 may be first detected by the first imager 51, and after the tool has traveled a distance of $D_{12}$, the same image 53' will then be seen by the second imager 52. Thus, when the second imager 52 sees the same image that was previously detected by the first imager 51, one can conclude that the tool has traveled a distance equaling the spacing between the two imagers 51 and 52. While this example uses only two imagers, one of ordinary skill in the art would appreciate that one may also use more imagers disposed at equal or unequal distances apart to track the distance of tool movement in the wellbore.

While the above examples use optical imagers to illustrate embodiments of the invention, one of ordinary skill in the art would appreciate that embodiments of the invention may also use other types of imagers or sensors. As noted above, embodiments of the invention may also use an acoustic (or sonic) sensor, resistivity sensor, etc. Acoustic or sonic sensors have been widely used in borehole imaging. Examples for such imagers include Dipole Shear Sonic Imager (DSI®) from Schlumberger Technology Corp. (Houston, Tex.). Similarly, resistivity sensors have also been used in downhole imagers. Examples of downhole imagers using resistivity sensors include the Formation MicroImager (FMI®) from Schlumberger Technology Corp. (Houston, Tex.).

Furthermore, imagers of the invention may be mounted on a downhole tool, a collar, a sleeve, or a tubing. In most cases, high resolution (e.g., less than 1 cm) is not needed to track the tool movement (or depth) in a borehole. Therefore, it would be unnecessary to have the imager deployed close to the wall of the wellbore. However, if very accurate tracking is needed, one may dispose these imagers on an articulating arm so that the imagers may be urged against the wall of the wellbore, for example.

With embodiments of the invention, a user may perform various operations downhole based on the tool depth. Some of these operations may be preprogrammed so that the tool will automatically perform the action when it reaches a certain depth. Examples of such autonomous depth control operations may include a perforating gun that is dropped into the wellbore. Such a perforating gun may fire automatically when it reaches a preset depth.

Figure 6:
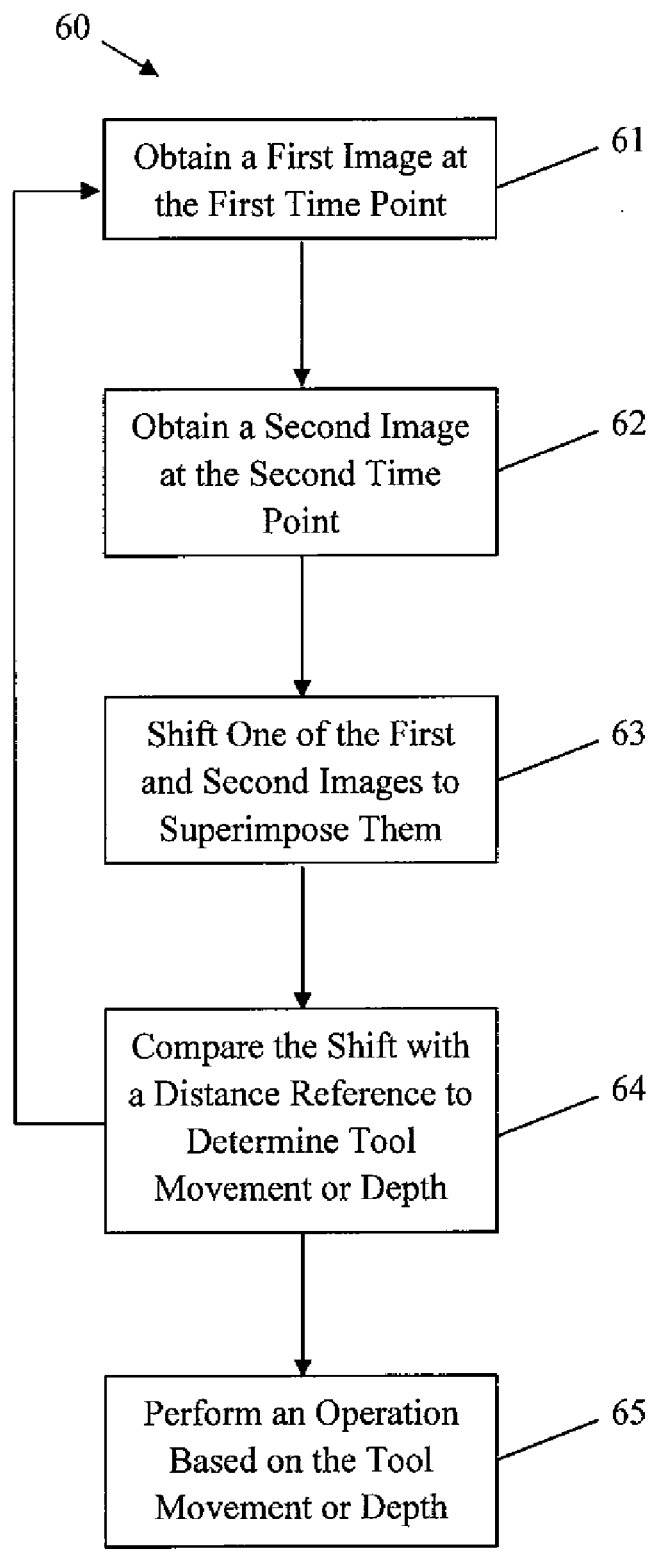
FIG. 6 shows a flow chart illustrating a method in accordance with one embodiment of the invention.

FIG. 6 illustrates a method 60 in accordance with one embodiment of the invention. As shown, a first image is obtained with an imager at the first time point (step 61). As noted above, any suitable imager may be used. At some point later, a second image is obtained (step 62). The two images are then compared and matched, by shifting one of the two images, so that the two images superimpose (step 63). The amount of shifting that is required to superimpose the two images is compared with a reference distance, which may be internal or external to the imager, to determine the tool location or depth in the wellbore (step 64). The above described steps may be repeated as many times as needed. Then, a downhole operation may be performed based on the determined tool location or depth in the wellbore (step 65).

Embodiments of the invention may have one or more of the following advantages. Embodiments of the invention may provide accurate depth measurement in a wellbore. The depth measurements may be performed autonomously, without user intervention. The depth measurements may be integrated into the measurement system so that activities that need to be referenced to existing borehole measurements can be accurately located. Embodiments of the invention may also be used to deal with stick slip motion because the depth measurements are made downhole.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking a location of a tool in a wellbore, comprising the steps of:
    (a) obtaining a first image of the wellbore using an imager associated with the tool;
    (b) obtaining a second image of the wellbore using the imager after a selected time period;
    (c) matching the first image with the second image by shifting one of the first image and the second image;
    (d) determining an amount of the shifting; and
    (e) comparing the amount of the shifting with a reference distance to determine a distance of tool movement in the wellbore,
    wherein steps (a)-(e) are performed in the wellbore.

2. The method of claim 1, wherein the reference distance is a length reference in the imager.

3. The method of claim 1, repeating steps (a)-(e).

4. The method of claim 3, further comprising performing a downhole operation when the distance of tool movement meets a selected criterion.

5. The method of claim 4, wherein the performing the downhole operation is triggered automatically without a user intervention.

6. The method of claim 1, wherein the imager is one selected from the group consisting of an optical imager, a sonic imager, an infrared imager, a microwave imager, and a resistivity imager.

7. A method for tracking a location of a tool in a wellbore, comprising the steps of:

(a) obtaining an image of a feature of the wellbore using a first imager associated with the tool;

(b) moving the tool in the wellbore; and (c) registering a distance of tool movement when the image of the feature is detected by a second imager spaced apart from the first imager, wherein the distance of tool movement equals a spacing between the first imager and the second imager, wherein steps (a)-(c) are performed in the wellbore.

8. The method of claim 7, repeating steps (a)-(c).

9. The method of claim 8, further comprising performing a downhole operation when the distance of tool movement meets a selected criterion.

10. The method of claim 9, wherein the performing the downhole operation is triggered automatically without a user intervention.

11. The method of claim 7, wherein the first imager and the second imager are one type selected from the group consisting of an optical imager, a sonic imager, an infrared imager, a microwave imager, and a resistivity imager.

12. A system for tracking a tool moving in a wellbore, comprising:

a processor and a memory on the tool, wherein the memory stores a program having instructions for:

(a) obtaining a first image of the wellbore using an imager associated with the tool;

(b) obtaining a second image of the wellbore using the imager after a selected time period;

(c) matching the first image with the second image by shifting one of the first image and the second image;

(d) determining an amount of the shifting; and (e) comparing the amount of the shifting with a reference distance to determine a distance of tool movement in the wellbore.

13. The system of claim 12, wherein the system is included in the tool.

14. The system of claim 12, wherein the imager is one selected from the group consisting of an optical imager, a sonic imager, an infrared imager, a microwave imager, and a resistivity imager.

15. A system for tracking a tool moving in a wellbore, comprising:

a processor and a memory on the tool, wherein the memory stores a program having instructions for:

(a) obtaining an image of a wellbore feature using a first imager associated with the tool;

(b) moving the tool in the wellbore; and (c) registering a distance of tool movement when the image of the wellbore feature is detected by a second imager spaced apart from the first imager, wherein the distance of tool movement equals a spacing between the first imager and the second imager.

16. The system of claim 15, wherein the system is included in the tool.

17. The system of claim 15, wherein the first imager and the second imager are one type selected from the group consisting of an optical imager, a sonic imager, an infrared imager, a microwave imager, and a resistivity imager.

* * * * *